(12) United States Patent
Moore et al.

(10) Patent No.: US 11,858,402 B2
(45) Date of Patent: Jan. 2, 2024

(54) VEHICLE RAMP SYSTEM

(71) Applicants: Edward F. Moore, Shelley, ID (US); Cynthia D. Moore, Shelley, ID (US)

(72) Inventors: Edward F. Moore, Shelley, ID (US); Cynthia D. Moore, Shelley, ID (US)

( * ) Notice: Subject to any disclaimer, the term of this patent is extended or adjusted under 35 U.S.C. 154(b) by 0 days.

(21) Appl. No.: 18/143,662

(22) Filed: May 5, 2023

(65) Prior Publication Data
US 2023/0356643 A1 Nov. 9, 2023

Related U.S. Application Data

(60) Provisional application No. 63/339,272, filed on May 6, 2022.

(51) Int. Cl.
*B60P 1/43* (2006.01)

(52) U.S. Cl.
CPC ..................... *B60P 1/43* (2013.01)

(58) Field of Classification Search
CPC ....................................................... B60P 1/43
See application file for complete search history.

(56) References Cited

U.S. PATENT DOCUMENTS

2018/0334071 A1* 11/2018 Stojkovic ................. B60P 1/43
2020/0215954 A1* 7/2020 Delanghe ............... B65G 69/30

* cited by examiner

*Primary Examiner* — Saul Rodriguez
*Assistant Examiner* — Willie W Berry, Jr.

(57) ABSTRACT

A vehicle ramp system includes a first ramp and a second ramp each removably attachable to a truck bed. The first and second ramps may each be attached to the truck bed via numerous brackets and a ramp fastener. Further, the first and second ramps may each include a panel removably attachable thereto. Accordingly, once the first and second ramps are coupled to the truck bed, a UTV can be positioned thereon, thereby allowing the UTV to be elevated within the truck's bed. Due to the elevated position of the UTV, a storage area is created between a bottom of the UTV and the truck bed, where a user can place tools, camping equipment, luggage, etc.

18 Claims, 9 Drawing Sheets

VEHICLE RAMP SYSTEM

CROSS-REFERENCE TO RELATED APPLICATIONS

This application claims the benefit of U.S. Provisional Application Ser. No. 63/339,272, filed on May 6, 2022, which is incorporated herein by reference.

TECHNICAL FIELD

The present disclosure relates to a vehicle ramp. More particularly, the present disclosure relates to a vehicle ramp that may be coupled inside a bed of a truck for a utility task vehicle (UTV).

BACKGROUND

UTVs have become extremely popular in this country for recreation and performing various tasks around the farm and house. To transport UTVs, many use trailers, whether enclosed or open, platforms that attach to the truck bed and position the UTV perpendicular thereto, or the truck bed. Some of these options may be beneficial at different times. For example, when a user is pulling a camper trailer, the user may want the UTV in the truck bed so as to remove the need to pull two trailers: the camper trailer being one and a UTV trailer being the other.

When using the bed of the truck, any storage space present in the truck bed is removed, thereby forcing a user to place other items inside the UTV, inside the cab of the vehicle, or in an additional trailer. Platforms that position the UTV perpendicular to the truck bed remove this issue and allow users to place items in the truck bed. However, there are inherent dangers in positioning a UTV on top of the truck's bed perpendicular to the truck. These types of ramps increase the risks of driving too far over the bed and damaging the UTV. In addition, these ramps increase the height at which a typical UTV is secured to a truck or trailer, which if it were to fall due to increased wind resistance, there may be damage to the UTV, the user, and/or others.

Accordingly, there is a need for a ramp system that is coupleable to a truck bed and that allows a user to utilize the storage space of the truck bed while a UTV is positioned therein. The present invention seeks to solve these and other problems.

SUMMARY OF EXAMPLE EMBODIMENTS

In one embodiment, a vehicle ramp system comprises a first ramp and a second ramp each removably attachable to a truck bed. The first and second ramps may each be attached to the truck bed via a first and a second lower bracket, a first and a second upper bracket, and a ramp fastener. Further, the first and second ramps may comprise a first panel and a second panel, respectively, removably attachable thereto. Accordingly, once the first and second ramps are coupled to the truck bed a UTV can be positioned thereon, thereby allowing the UTV to be elevated within the truck's bed. Due to the elevated position of the UTV, a storage area is created between a bottom of the UTV and the truck's bed, where a user can place tools, camping equipment, luggage, etc.

A UTV ramp may be used to get a UTV onto the tailgate of the truck and up and onto the first and second ramps. Once the UTV is positioned on the first and second ramps, a user may utilize the storage area underneath the UTV.

DETAILED DESCRIPTION OF EXAMPLE EMBODIMENTS

Figure 1:
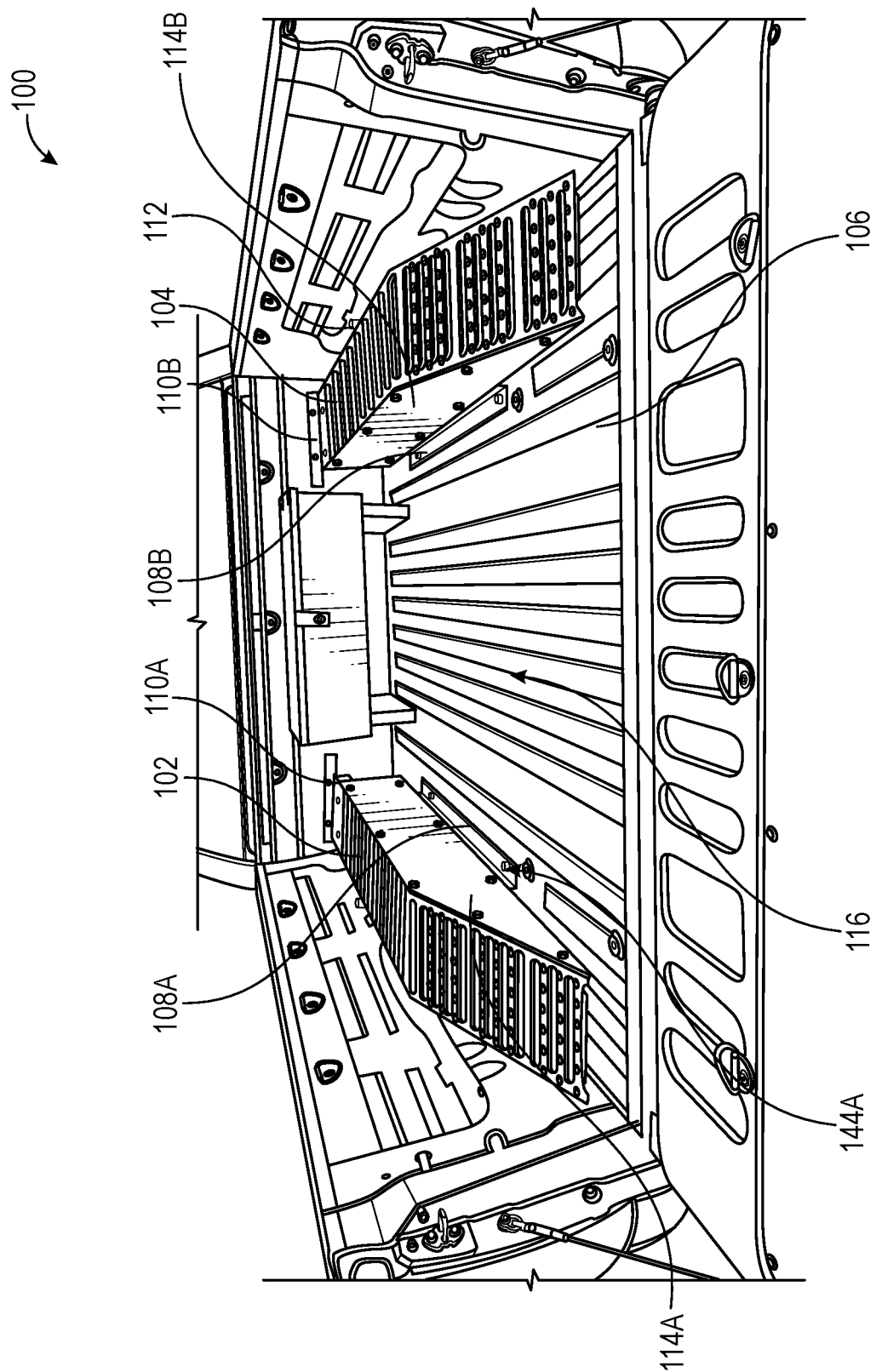
FIG. 1 illustrates a rear, top perspective view of a vehicle ramp system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a ramp system that is coupleable to a truck bed and that allows a user to utilize the storage space of the truck bed while a UTV is positioned therein. The present invention seeks to solve these and other problems.

There are many ways to transport UTVs, including trailers, whether enclosed or open, platforms that attach to the truck bed and position the UTV perpendicular thereto, or the truck bed. Each of these options may be desired at certain times depending on the situation. Further, some of these options place different dangers and choices on a user. For example, if wanting to pull a camper trailer and a UTV trailer, a difficult driving situation may be created due to the length of the vehicle coupled to two trailers. In other situations, some may want a platform that rests on top of the truck bed. While these platforms allow access to the bed of the truck for storage, they also place the UTV in a precarious position, being extremely elevated increases the risk of falling and damage to the UTV and increases wind resistance while driving. Lastly, others may place the UTV directly in the truck bed. However, when using the bed of the truck, any storage space present in the truck bed is removed, thereby forcing a user to place items in the UTV, inside the cab of the vehicle, or in an additional trailer.

The vehicle ramp system described herein comprises a first ramp and a second ramp each of which may be removably attachable to a truck bed. In addition, the first and second ramps may come in a variety of sizes to fit different truck bed lengths. The first and second ramps may couple to the truck bed via first and second lower brackets and first and second upper brackets. These brackets allow the first and second ramps to be removably attachable to the truck bed and adjustable in height. Accordingly, if additional storage space is required in the truck bed for items, then the height of the first and second ramps may be adjusted. It will be appreciated that the vehicle ramp system is configured to create a storage area between the bottom of the UTV and the truck bed, thereby allowing a user to place items in that space.

As shown in FIG. 1, in one embodiment, a vehicle ramp system 100 comprises a first ramp 102 and a second ramp 104 each removably attachable to a truck bed 106. The first ramp 102 may be attached to the truck bed 106 via a first lower bracket 108A and a first upper bracket 110A, and a ramp fastener 112. The second ramp 104 may be attached to the truck bed 106 via a second lower bracket 108B, a second upper bracket 110B, and the ramp fastener 112. Further, the first and second ramps 102, 104 may comprise a first panel 114A and a second panel 114B, respectively, removably attachable thereto. The panels 114A, 114B may add rigidity and strength to the first and second ramps 102, 104. Accordingly, once the first and second ramps 102, 104 are coupled to the truck bed 106 a UTV can be positioned thereon, thereby allowing the UTV to be elevated within the truck bed 106. Due to the elevated position of the UTV, a storage area 116 may be created between a bottom of the UTV and the truck bed, where a user can place tools, camping equipment, luggage, etc.

The first and second ramps 102, 104 may be manufactured out of aluminum to decrease the weight of the system 100. Other materials that may be used to manufacture the first and second ramps 102, 104 may include, but are not limited to, steel, fiberglass, plastic, and carbon. The first and second ramps 102, 104 may come in a variety of lengths to fit in any size of truck bed 106 whether long or compact beds. In addition, the first and second ramps 102, 104 may be a variety of heights, depending on the desired storage area in the truck bed 106. Furthermore, the first and second ramps 102, 104 may be a variety of widths to accept any width of tire.

As shown in FIG. 2-5, on a first upper surface 118A of the first ramp 102 and the second upper surface 118B of the second ramp 104, in some embodiments, there may be one or more traction protrusions 120A, 120B, assisting UTV tires in moving forward on the first and second ramps 102, 104. The protrusions 120A, 120B may be cylindrically shaped with an aperture. In some embodiments, the protrusions 120A, 120B may be any other shape or configuration so as to provide traction for UTV, lawnmower, or any other type of tire. The first and second ramps 102, 104 may comprise first and second rung-like slats 122A, 122B on the first and second upper surfaces 118A, 118B, respectively, which can assist in decreasing the weight and cost thereof. In some embodiments, the first and second upper surfaces 118A, 118B may lack slots and be a continuous sheet of material, with or without traction protrusions.

Figure 4:
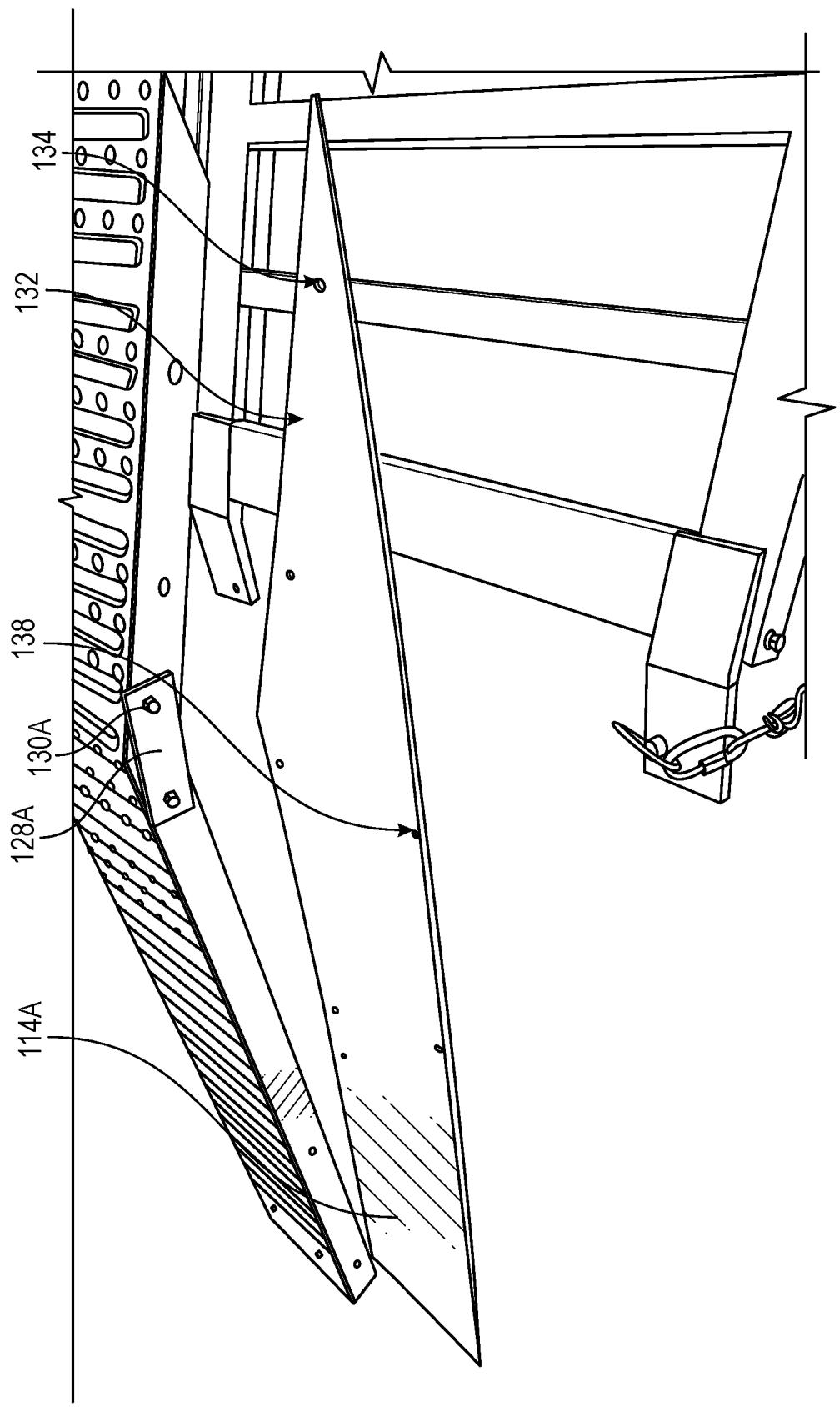
FIG. 4 illustrates a side perspective view of a first ramp and a first panel of a vehicle ramp system.

The first ramp 102 may comprise a first portion 124A and a second portion 126A. The second ramp 104 may comprise a third portion 124B and a fourth portion 126B. The first portion 124A may be angled in relation to the truck bed 106 so as to allow a UTV or other vehicle to initiate contact with the first ramp 102. The first portion 124A may be positioned proximate the tailgate of the truck. The second portion 126A may be generally parallel to the truck bed 106 so as to be a resting platform for a UTV or another vehicle. As shown in FIG. 4, to maintain the first portion 124A at an angle, the first ramp 102 may receive a first ramp plate 128A secured thereto via first fasteners 130A. The first fasteners 130A may comprise bolts and nuts. Other first fasteners 130A may include welding, rivets, or other fastening devices.

Referring back to FIG. 3, similar to the first ramp 102, the third portion 124B of the second ramp 104 may be angled in relation to the truck bed 106 so as to allow a UTV or other vehicle to initiate contact with the second ramp 104. The third portion 124B may be positioned proximate the tailgate of the truck. The fourth portion 126B may be parallel to the truck bed 106 so as to be a resting platform for a UTV or another vehicle. To maintain the third portion 124B at an angle, the second ramp 104 may receive a second ramp plate (Not shown, same as first plate 128A) secured thereto via second fasteners (not shown, same as the first fasteners 130A). The second fasteners may comprise bolts. Other first fasteners may include brackets or other fastening devices.

Referring back to FIGS. 1-3, the first panel 114A may be removably attachable to a first side 132A of the first ramp 102, the first ramp 102 also comprising a second side 132B. The second panel 114B may be removably attachable to a third side 132C of the second ramp 104, the second ramp 104 also comprising a fourth side 132D. The first and second panels 114A, 114B may each mirror the angles of the first and second ramps 102, 104, respectively, so as to be coupleable thereto. The first and second panels 114A, 114B may comprise first and second upper panel apertures 134A, 134B, respectively, to receive panel fasteners 136 (FIG. 3) so as to attach the first panel 114A to the first ramp 102 and the second panel 114B to the second ramp 104.

Figure 3:
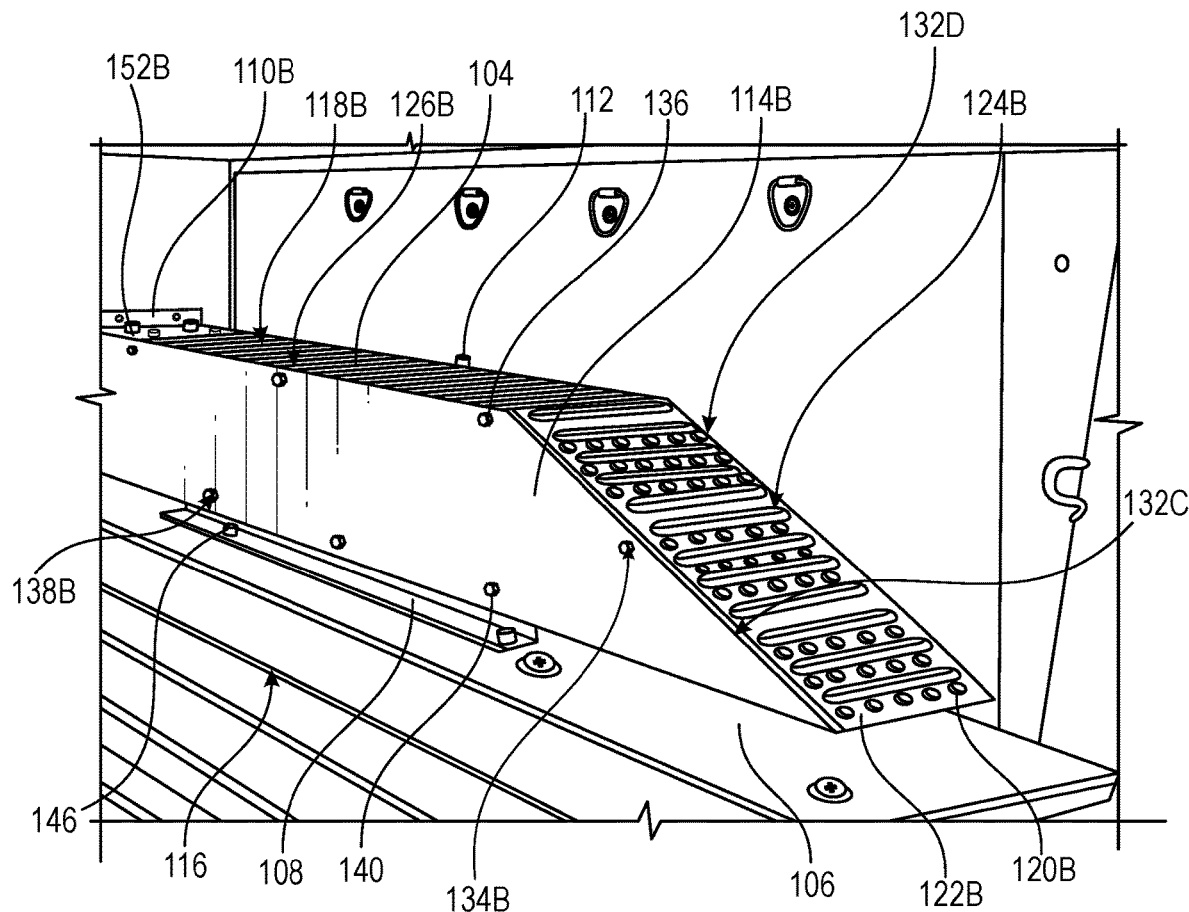
FIG. 3 illustrates a side perspective view of a second ramp of a vehicle ramp system.
Figure 9:
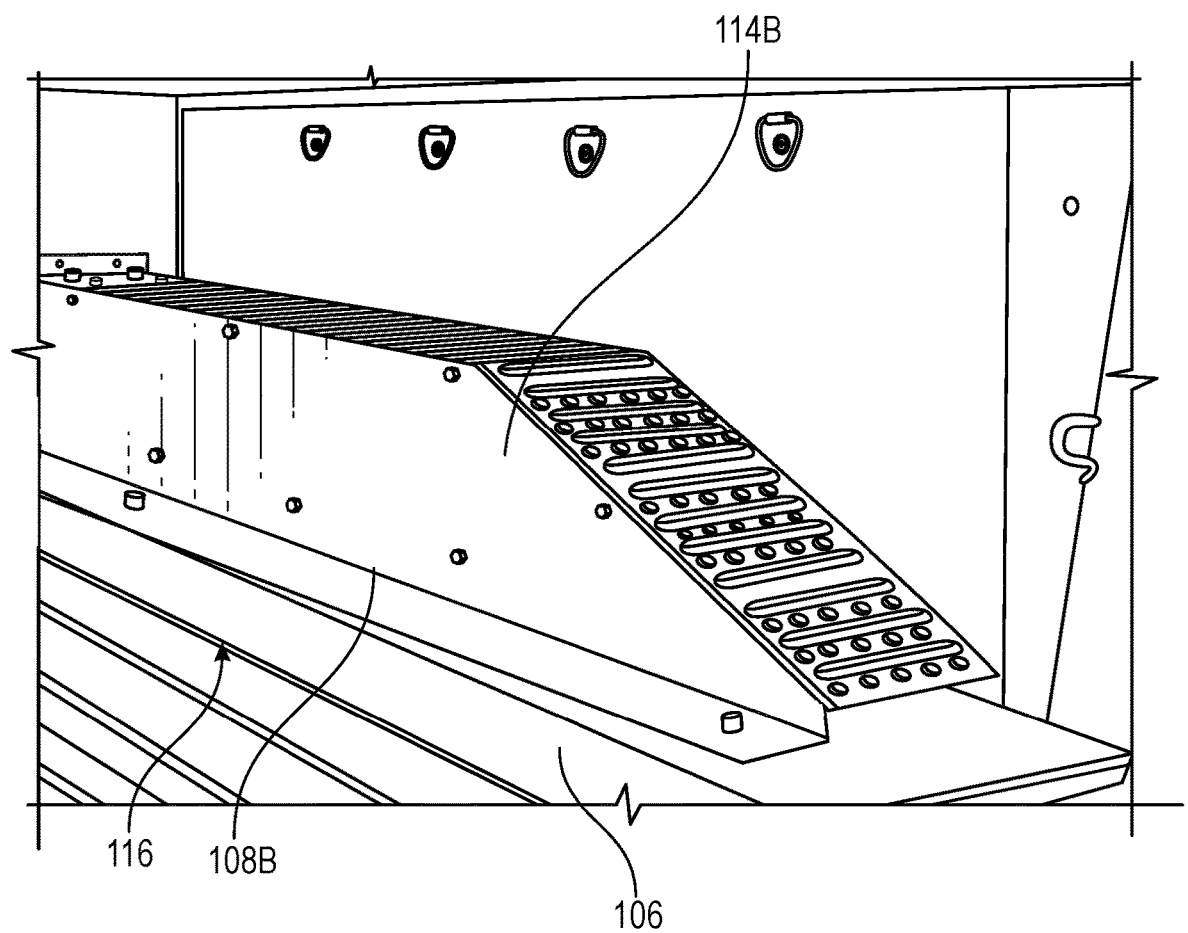
FIG. 9 illustrates a side perspective view of a second ramp of a vehicle ramp system.

In some embodiments, the first and second ramps 102, 104 and the panels 114A, 114B may be manufactured so as to be a single unit. That is, for example, the first panel 114A integrated with the first ramp 102. The first and second panels 114A, 114B may be manufactured from the same material as the first and second ramps 102, 104, such as aluminum. However, in some embodiments, the first and second ramps 102, 104 may be manufactured from a different material than the first and second panels 114A, 114B. For example, the first and second ramps 102, 104 may be manufactured from aluminum while the first and second panels 114A, 114B may be manufactured from steel. The first ramp 102 with the first panel 114A and the second ramp 104 with the second panel 114B may each be configured to sit over the wheel wells in the truck bed 106. Accordingly, the first panel 114A may be positioned on a single, inner-facing side of the first ramp 102 and the second panel 114B may be positioned on a single, inner-facing side of the second ramp 104 so as to leave the other side open to rest on top of the wheel wells. In some embodiments, the first and second ramps 102, 104 may each comprise panels on both sides, wherein the additional panel includes a cutout to receive a wheel well in the truck bed. The first and second panels 114A, 114B may comprise first and second lower panel apertures 138A, 138B to receive lower panel fasteners 140 (FIG. 3). It will be understood that the lower panel fasteners 140 may allow the first and second ramps 102, 104 with their respective first and second panels 114A, 114B to be coupled to the first and second brackets 108A, 108B and thus, the truck bed 106. It will be appreciated that the first and second ramps 102, 104 with the first and second panels 114A, 114B may be removably attachable to the first and second brackets 108A, 108B, respectively. In some embodiments, the first panel 114A and the first lower bracket 108A may be a single unit coupleable to both the first ramp 102 and the truck bed 106 and the second panel 114B and the second lower bracket 108B may be a single unit (i.e., manufactured from a single piece of material) coupleable to the second ramp 104 and the truck bed 106 (shown in FIG. 9).

Figure 2:
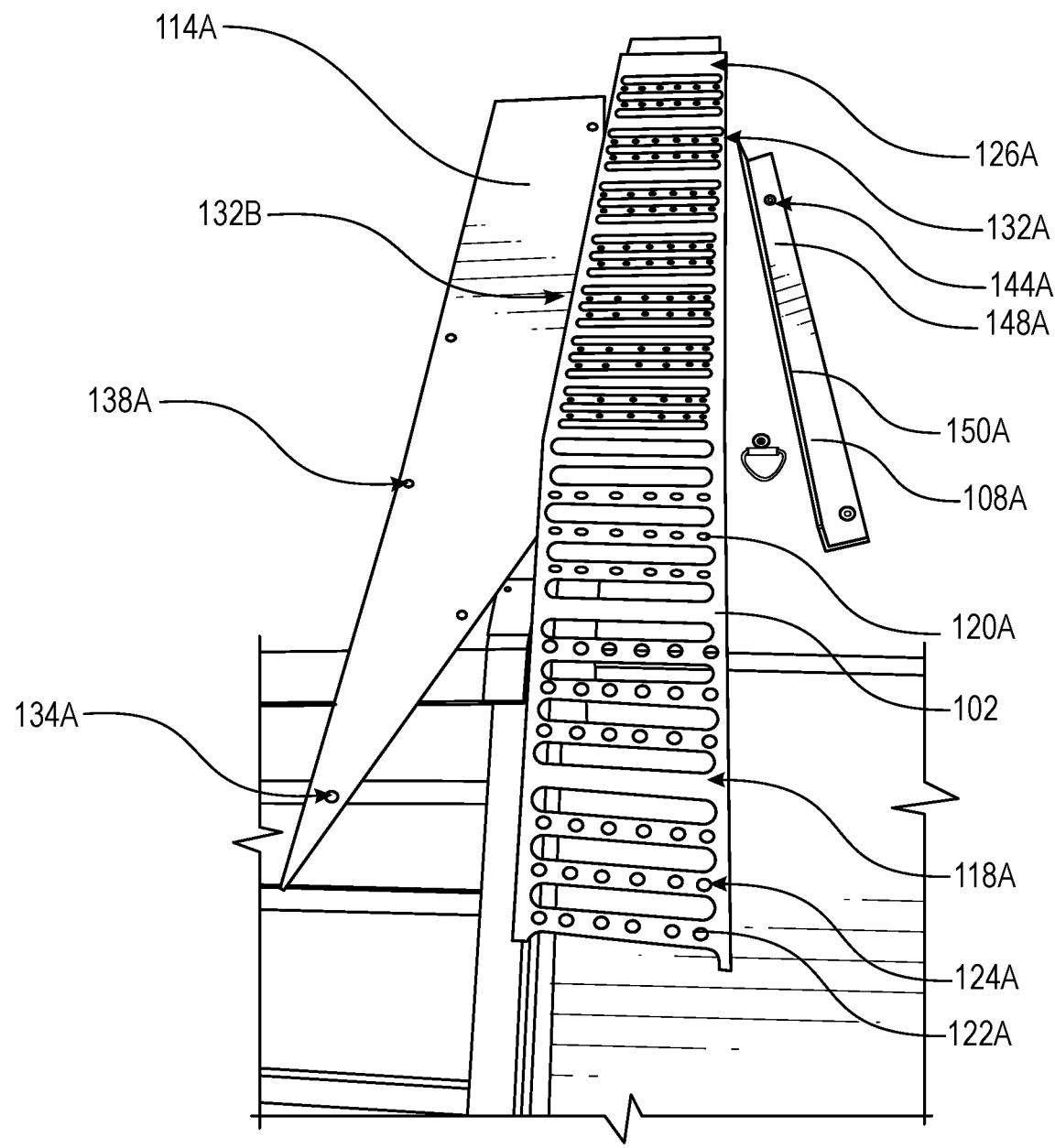
FIG. 2 illustrates a top perspective view of a first ramp, first panel, and a first lower bracket of a vehicle ramp system.
Figure 5:
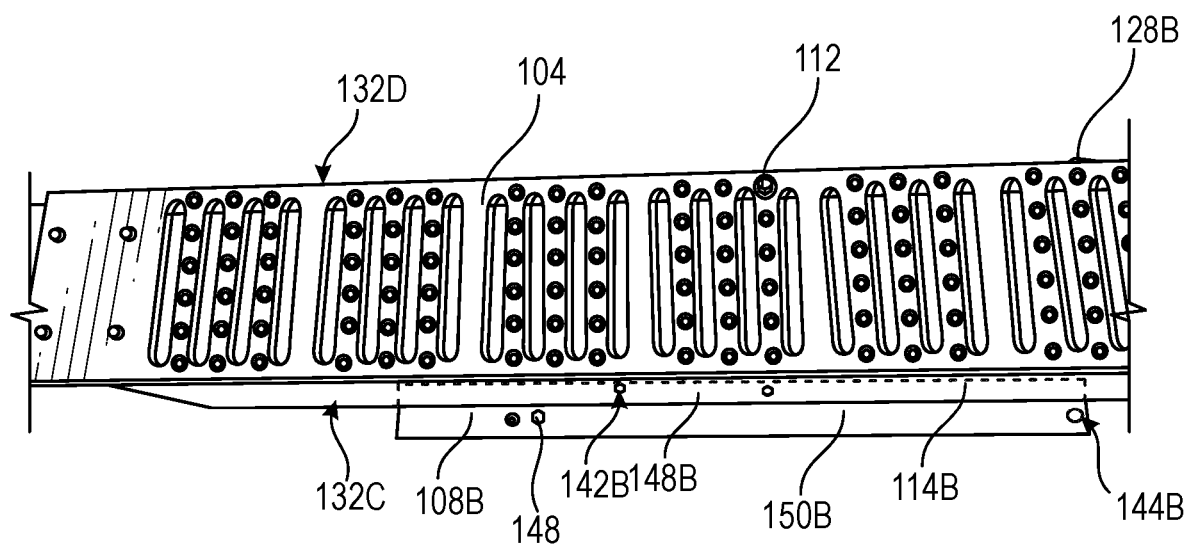
FIG. 5 illustrates a top perspective view of a second ramp of a vehicle ramp system.

As shown in FIGS. 2 and 5, the first lower bracket 108A and the second lower bracket 108B may comprise first upper and second upper panel apertures 142A (FIG. 6), 142B, respectively, so as to receive the panel fasteners 140. The first lower bracket 108A with the first upper panel apertures 142A so as to move the first ramp 102 from a first height to a second height, where the first height is lower than the second height. In some embodiments, the first ramps 102 may be adjusted to any number of heights via the first panel apertures 142A, or another adjustment mechanism. While only two panel apertures are shown vertically in line for adjustment purposes, it will be appreciated that there may be one or more panel apertures to adjust the height of the first ramp 102. Referring back to FIG. 1, one or more first bed apertures 144A may be placed on the first lower bracket 108A to receive bed fasteners 146 (FIG. 3). The bed fasteners 146 may couple the first lower bracket 108A to the truck bed 106. The first lower bracket 108A may, in some embodiments, be an L-shaped bracket. As such, the first lower bracket 108A may comprise a first side 148A and a second side 150A. The first side 148A may comprise the first upper panel apertures 142A and when placed on the truck bed 106 may be perpendicular thereto. The second side 150A may comprise the bed apertures 144A and be placed against the truck bed 106.

Referring to FIG. 5, the second lower bracket 108B may comprise multiple second upper panel apertures 142B so as to move the second ramp 104 from a first height to a second height, where the first height is lower than the second height. In some embodiments, the second ramp 104 may be adjusted to any number of heights via the second panel apertures 142B, or another adjustment mechanism. While only two panel apertures are shown vertically in line for adjustment purposes, it will be appreciated that there may be one or more panel apertures to adjust the height of the second ramps 104. One or more second bed apertures 144B may be placed on the second lower bracket 108B to receive bed fasteners 148. The bed fasteners 148 (e.g., bolt and nut) may couple the second lower bracket 108B to the truck bed 106. The second lower bracket 108B may, in some embodiments, be an L-shaped bracket. As such, the second lower bracket 108B may comprise a third side 148B and a fourth side 150B. The third side 148B may comprise the second upper panel apertures 142B and when placed on the truck bed 106 may be perpendicular thereto. The fourth side 150B may comprise the bed apertures 144B and be placed against the truck bed 106.

As an example, to couple the first panel 114A to the first lower bracket 108A, a user would position the second side 150A of the first lower bracket 108A against an inside surface of the first panel 114A, which would be coupled thereto via the lower panel fasteners 140. In addition, the ramp fastener 112 may couple the first and second ramps 102, 104 to the wheel well. The ramp fastener 112 may be a bolt. In some embodiments, the ramp fastener 112 may include a bracket to couple to the wheel wells of the truck or any other type of coupling mechanism.

Figure 6:
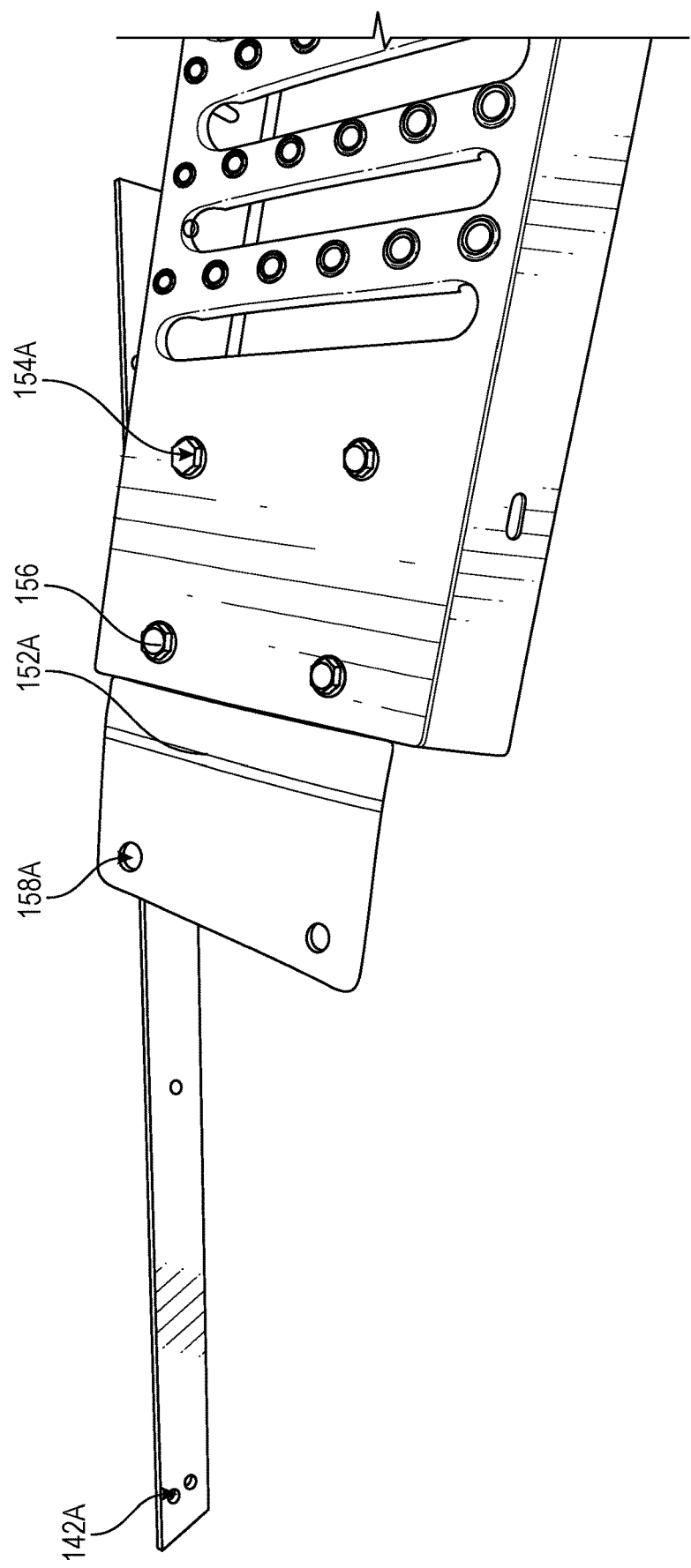
FIG. 6 illustrates a side, top perspective view of a first ramp of a vehicle ramp system.

Furthermore, as shown in FIG. 6, a first bracket panel 152A may comprise multiple first bracket panel apertures 154A to receive fasteners 156. Some of the fasteners 156 may be used to couple the bracket panel 152A to the first and second ramps 102, 104. The first bracket panel 152A may also comprise first panel apertures 158A that interact with the first upper bracket 110A. The first bracket panel 152A may be generally square-shaped and the same width as an upper surface of the first ramp 102. However, in some embodiments, the first bracket panel 152A may be narrower or wider than the upper surface of the first ramp 102. A second bracket panel 152B (FIG. 3) may comprise multiple second bracket panel apertures to receive fasteners 156. Some of the fasteners 156 may be used to couple the first and second bracket panels 152A, 152B to the first and second ramps 102, 104. The second bracket panel 152B may also comprise second panel apertures (not shown, same as 158A) that interact with the second upper bracket 110B. The second bracket panel 152B may be generally square-shaped and the same width as an upper surface of the second ramp 104. However, in some embodiments, the second bracket panel 152B may be narrow or wider than the upper surface of the second ramp 104. It would be understood that the first and second bracket panels 152A, 152B may vary in length to adjust to any length of truck bed. Furthermore, the first and second bracket panels 152A, 152B may be manufactured as a single unit with the first and second ramps 102, 104, respectively.

Figure 7:
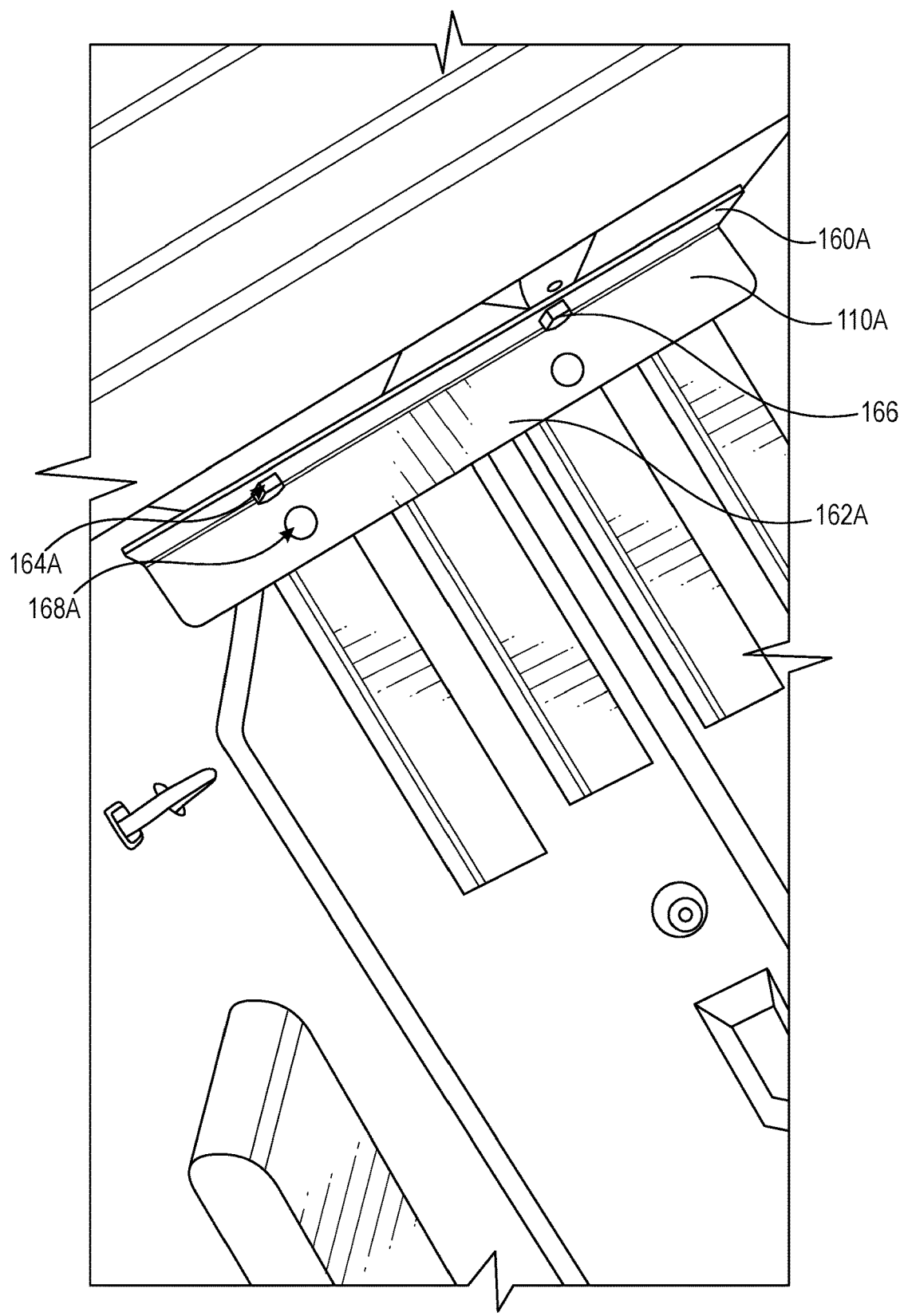
FIG. 7 illustrates a top perspective view of a first upper bracket of a vehicle ramp system coupled to a truck bed.

As shown in FIG. 7, the first upper bracket 110A may be an L-shaped bracket with a first side 160A and a second side 162A. The first side 160A may comprise one or more first side apertures 164A to receive upper bracket fasteners 166 (e.g., bolts) so that the first side 160A may be attached to a vertical backwall of the truck bed 106 opposite the tail gate. The second side 162A may comprise one or more second side apertures 168A to receive fasteners. The second side apertures 168A may align with the first panel apertures 158A so as to couple the first bracket panel 152A to the first upper bracket 110A. In particular, the first bracket panel 152A may rest on the second side 162A and be coupled thereto.

In the same manner, the second upper bracket 110A may be an L-shaped bracket with a third side and a fourth side (not shown, same as the first upper bracket 110A. The third side may comprise one or more third side apertures to receive the upper bracket fasteners 168 (e.g., bolts) so that the third side may be attached to a vertical backwall of the truck bed 106. The fourth side may comprise one or more fourth side apertures to receive fasteners. The fourth side apertures may align with the second panel apertures so as to couple the second upper panel 154B to the second upper bracket 110B.

Figure 8:
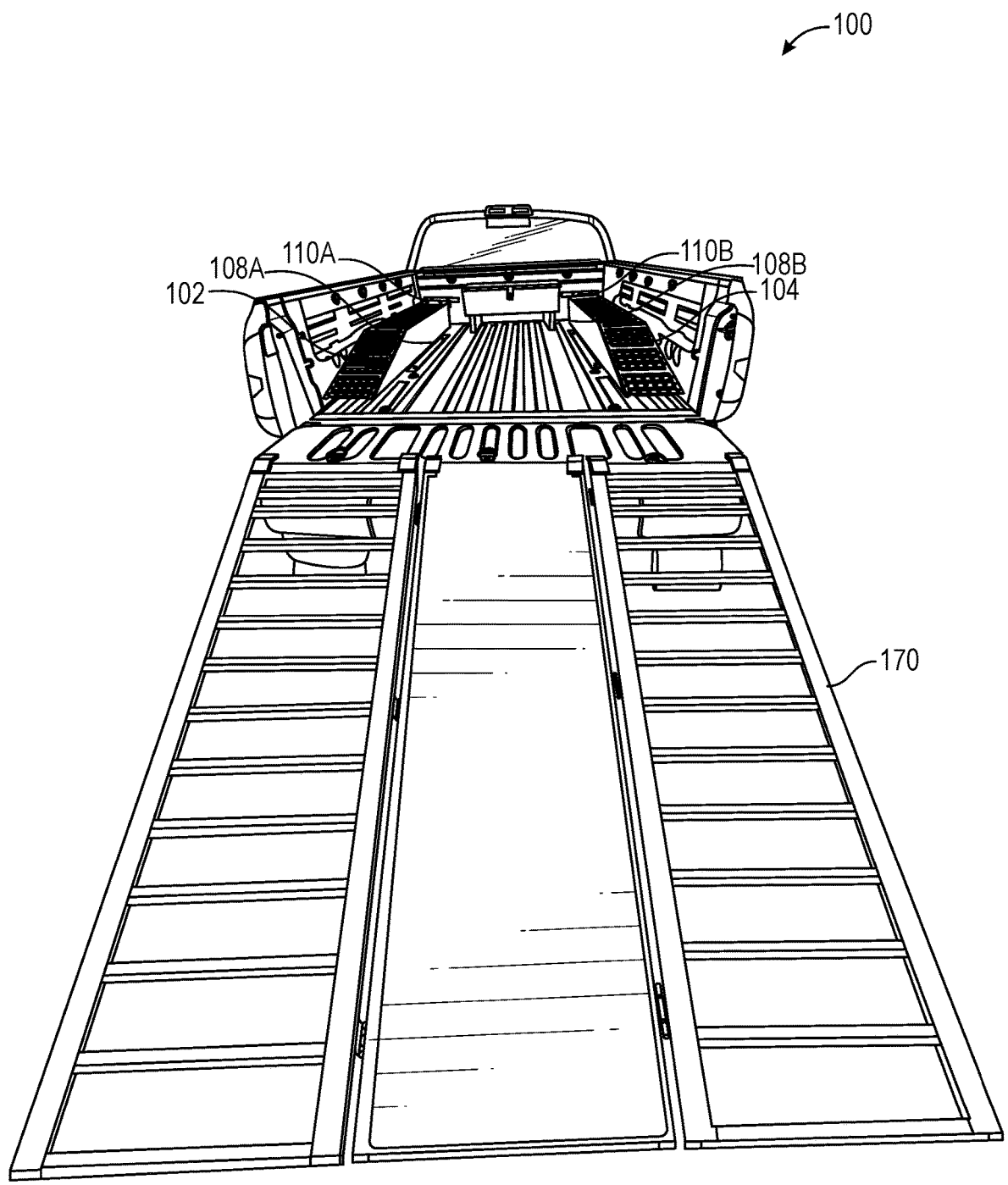
FIG. 8 illustrates a rear perspective view of a vehicle ramp system.

As shown in FIG. 8, a UTV ramp 170 may be used to get a UTV onto the tailgate of the truck and up and onto the first and second ramps 102, 104. Once the UTV is positioned on the first and second ramps 102, 104, a user may utilize the storage area underneath the UTV. The vehicle ramp system 100 allows a user to utilize the entire bed of the truck, thereby allowing a user to place the UTV into the truck and store items underneath the UTV.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A vehicle ramp system comprising:
   a first ramp positioned above a first wheel well in a vehicle, the first ramp comprising:
      a first side and a second side;
      a first upper surface comprising a plurality of first protrusions that provide traction for tires of a second vehicle;
      a first portion that is angled downward toward a bed of the vehicle, the first portion positioned proximate a rear end of the vehicle;
      a second portion that is parallel with the bed of the vehicle;
   a first upper bracket that couples the first ramp to a back of the bed;
   a first bracket panel that couples to the first ramp and the first upper bracket;
   a second ramp positioned above a second wheel well in the vehicle, the second ramp comprising:
      a third side and a fourth side;
      a second upper surface comprising a plurality of second protrusions that provide traction for the tires of the second vehicle;
      a third portion that is angled downward toward the bed of the vehicle, the third portion proximate the rear end of the vehicle;
      a fourth portion that is parallel with the bed of the vehicle;
   a second upper bracket that couples the second ramp to the back of the bed;
      a second bracket panel that couples to the second ramp and the second upper bracket;
      wherein when the first ramp and the second ramp are fastened to the vehicle and the second vehicle is positioned thereon, a storage area is created between the first and second ramp and the bed of the vehicle.

2. The vehicle ramp system of claim 1, wherein the first and second ramps are manufactured from a steel material.

3. The vehicle ramp system of claim 1, wherein the plurality of the first and second protrusions are cylindrical with apertures therethrough.

4. The vehicle ramp system of claim 1, further comprising a first ramp plate that maintains the first portion at an angle to the second portion and is positioned at the junction of the first portion and the second portion.

5. The vehicle ramp system of claim 1, further comprising a second ramp plate that maintains the third portion at an angle to the fourth portion and is positioned at the junction of the third portion and the fourth portion.

6. The vehicle ramp system of claim 1, further comprising a first lower bracket and a second lower bracket, which are each an L-shaped bracket.

7. The vehicle ramp system of claim 6, wherein a first panel is removably attachable to the first side of the first ramp and coupleable to the first lower bracket that fastens to the bed of the vehicle, the first panel mirroring the shape and size of the first side.

8. The vehicle ramp system of claim 7, wherein the first panel comprises first upper panel apertures and first lower panel apertures.

9. The vehicle ramp system of claim 6, wherein a second panel is removably attachable to the third side of the second ramp and coupleable to the second lower bracket that fastens to the bed of the vehicle, the second panel mirroring the shape and size of the third side.

10. The vehicle ramp system of claim 9, wherein the second panel comprises second upper panel apertures and second lower panels apertures.

11. The vehicle ramp system of claim 1, wherein the first upper bracket and the second upper bracket are each an L-shaped bracket.

12. The vehicle ramp system of claim 1, wherein the first ramp comprises first slats.

13. The vehicle ramp system of claim 1, wherein the second ramp comprises second slats.

14. A vehicle ramp system comprising:
   a first ramp comprising:
      a first side and a second side;
      a first portion that is angled downward toward a bed of a vehicle, the first portion positioned proximate a rear end of the vehicle;
      a second portion that is parallel with the bed of the vehicle;
      a first upper surface comprising a plurality of first protrusions that provide traction for tires of a second vehicle;
   a first panel removably attachable to the first side of the first ramp, the first panel mirroring the shape and size of the first side, the first panel comprising first upper panel apertures that receive panel fasteners and first lower panel apertures that receive lower panel fasteners;

a first upper bracket that couples the first ramp to a back of the bed;

a first bracket panel that couples to the first ramp and the first upper bracket;

a second ramp comprising:
   a third side and a fourth side;
   a third portion that is angled downward toward the bed of the vehicle, the third portion positioned proximate the rear end of the vehicle;
   a fourth portion that is parallel with the bed of the vehicle;
   a second upper surface comprising a plurality of second protrusions that prove traction for the tires of the second vehicle;

a second panel removably attachable to a third side of the second ramp, the second panel mirroring the shape and size of the third side, the second panel comprising second upper panel apertures that receive the panel fasteners and second lower panel apertures that receive the lower panel fasteners;

a second upper bracket that couples the second ramp to the back of the bed;

a second bracket panel that couples to the second ramp and the second upper bracket;
   wherein when the first ramp and the second ramp are positioned in the vehicle and the second vehicle is positioned thereon, a storage area is created between the first and second ramp and the bed of the vehicle.

15. The vehicle ramp system of claim 14, further comprising a first lower bracket that couples the first panel to the bed of the vehicle.

16. The vehicle ramp system of claim 14, further comprising a second lower bracket that couples the second panel to the bed of the vehicle.

17. The vehicle ramp system of claim 14, further comprising a first ramp plate on the first ramp and a second ramp plate on the second ramp.

18. A vehicle ramp system comprising:
a first ramp positioned above a first wheel well of a vehicle, the first ramp comprising:
   a first side and a second side;
   a first portion that is angled downward toward a bed of the vehicle, the first portion positioned proximate a rear end of the vehicle;
   a second portion that is parallel with the bed of the vehicle;
   a first upper surface comprising a plurality of first protrusions that provide traction for tires of the second vehicle;

a first panel removably attachable to a first side of the first ramp, the first panel mirroring the shape and size of the first side, the first panel comprising first upper panel apertures and first lower panel apertures;

a first lower bracket that couples the first panel to the bed of the vehicle;

a first upper bracket that couples the first ramp to a back of the bed;

a first bracket panel that couples to the first ramp and the first upper bracket;

a second ramp positioned above a second wheel well of the vehicle, the second ramp comprising:
   a third side and a fourth side;
   a third portion that is angled downward toward the bed of the vehicle, the third portion proximate the rear end of the vehicle;
   a fourth portion that is parallel with the bed of the vehicle;
   a second upper surface comprising a plurality of second protrusions that provide traction for the tires of the second vehicle;

a second panel removably attachable to a third side of the second ramp, the second panel mirroring the shape and size of the third side, the second panel comprising second upper panel apertures and second lower panel apertures;

a second lower bracket that couples the second panel to the bed of the vehicle;

a second upper bracket that couples the second ramp to the back of the bed;

a second bracket panel that couples to the second ramp and the second upper bracket;

wherein when the first ramp and the second ramp are positioned in the vehicle and the second vehicle is positioned thereon, a storage area is created between the first and second ramp and the bed of the vehicle.

* * * * *